United States Patent [19]
Warmenhoven

[11] Patent Number: 6,137,659
[45] Date of Patent: Oct. 24, 2000

[54] ACTUATOR ASSEMBLY FOR SERVO-CONTROLLED TAPE

[76] Inventor: Coen Warmenhoven, 8475 Edgemont Way, Colorado Springs, Colo. 80919-3874

[21] Appl. No.: 09/209,087

[22] Filed: Dec. 10, 1998

[51] Int. Cl.[7] .............................. G11B 5/55; G11B 15/00
[52] U.S. Cl. ........................................ 360/261.1; 360/96.1
[58] Field of Search ................................... 360/104–106, 360/96.1, 96.2, 96.4, 130.21, 130.22

[56] References Cited

U.S. PATENT DOCUMENTS 5,414,578  5/1995  Lian et al. ............................... 360/106

FOREIGN PATENT DOCUMENTS 07029265  3/1995  Japan .

*Primary Examiner*—Allen T. Cao
*Attorney, Agent, or Firm*—Edward W. Goodman

[57] ABSTRACT

A magnetic tape drive comprising a magnetic head for reading and/or writing a magnetic tape passing thereover. The magnetic head is positioned for tracking a select track or series of tracks on the tape. The head is generally fixed to a frame or can be rendered stationary with respect to a frame. A source of magnetic tape, such as a reel, is positioned to a side of the magnetic head, while a collector of magnetic tape, such as a second reel, is also positioned to a side of the magnetic head. For tracking, at least one tape actuator is positioned between the magnetic head and either the source and collector. The tape actuator is comprised of a base with a surface portion defining a tape path over which the magnetic tape passes. At least the base of the tape actuator is attached to the frame, or may be rendered stationary with respect to the frame. The tape actuator also includes at least one movable portion adjacent a first edge of the tape path and a corresponding counter-balancing portion adjacent the opposite (second) edge of the tape path. The movable portion is coupled to or interfaces with a drive for imparting movement to the movable portion in a direction transverse to the tape path. The movable portion has a hardened engagement portion for engaging the first edge of a tape in the tape path. The counter-balancing portion is resiliently movable in a direction transverse to the tape path and also has a hardened engagement portion for engaging the second edge of a tape in the tape path.

12 Claims, 5 Drawing Sheets

ACTUATOR ASSEMBLY FOR SERVO-CONTROLLED TAPE

FIELD OF THE INVENTION

This invention relates to magnetic tape recording and playback devices and, in particular, to positioning the tape with respect to the head of such devices.

BACKGROUND OF THE INVENTION

The art is replete with successive generations of magnetic tape drives. In general, the heart of a magnetic tape drive is comprised of a magnetic head for reading (and/or writing) the magnetic tape that passes over it. As is known in the art, when the magnetic tape passes over a magnetic head, the magnetic signals impressed in the tape are read by the magnetic head and sent on to other electronic systems for processing and amplification. On the other hand, a magnetic head may also be used to write or send data for storage onto a magnetic tape passing over it.

In a tape drive, the magnetic tape is normally fed out from one reel, across the magnetic head, and collected by a second reel. The tape path from one reel to the other typically does not form a straight line, and typically forms an arc across the magnetic head. See, for example, FIG. 1.

The head in FIG. 1 is supported by a stepper motor which in turn is attached to the frame of the magnetic recording device. As described in more detail below, the stepper motor provides for a coarse adjustment of the head in a direction transverse to the tape path (shown by the arrow in FIG. 1). Interposed between the stepper motor and the head (but not shown in FIG. 1) are elements that provide for a tracking adjustment of the head, which are described further below with respect to FIG. 3.

Also shown in FIG. 1 are guides on each side of the head which constrain the transverse motion of the tape as it passes over the head. The guides in FIG. 1 are shown to be rollers with rotating flanges. Prior guides have also used, for example, rollers with non-rotating flanges or spring fingers.

Prior art tapes have multiple tracks, in order to maximize the storage capacity of the tape. FIG. 2a, for example, shows a tape head having read, write and read segments. The three segments allow the tape to read while being written in either direction, in order to confirm the accuracy of the written data. Each segment of the head in FIG. 2a is shown to have a series of "gaps" aligned in the direction of movement of the tape, where data is either read from or written to the tape passing over it, thus creating or reading a separate track. Since the normal movement of the tape is left to right in FIG. 2a (or vice versa), the tracks form a line along the length of the tape.

The bottom (fifth) track in FIG. 2a is shown to be a pre-written servo track used to position the tape. As described below, the signal read from the servo track is used to align the transverse position of the head and the tape. A typical servo "track" is actually comprised of two tracks, each of which have different frequencies. The head read element runs in between them, thus reading both signals and processing them to keep the gap centered between the two servo tracks. Thus, the servo track in FIG. 2a is actually comprised of two tracks, labeled X and Y. By keeping the fifth read gap aligned between servo tracks X and Y, the tape is maintained in a transversely fixed position with respect to the head. As a result, the magnetic data tracks that are written by the other write gaps (tracks 1–4) are at a fixed transverse distance from the servo tracks. When read, the servo track maintains each track properly aligned with that track's respective read gap on the head.

As shown in FIG. 2b, by transversely repositioning the alignment of the tape and the head, another series of data tracks can be written to (and subsequently read from) the tape. Thus, the data tracks in FIG. 2b having the "a" suffix can be envisioned as corresponding to the tracks in FIG. 2a and created by tracking the tape using servo tracks X and Y. By transversely repositioning the head and the tape so that the fifth gap of the head lies between servo tracks Y and Z, a second series (labeled with the suffix "b") can be created (and then read) at each gap position. As seen, the head and the tape must be moved transversely with respect to each other by at least one gap width (or, equivalently, one track width), so that the adjacent tracks are sufficiently separated in the transverse direction.

A series of data tracks can be created (and read) in this manner. Thus, FIG. 2b could also have a series of tracks with a suffix "c". A series of three tracks would require a fourth servo track located below servo track Z. The number of tracks that can be created in this manner depends on the width of the gaps and the space between them.

In general, the initial positioning of the head with respect to the tracks that are to be read is done by a stepper motor that, as shown in FIG. 1, supports the head and is affixed to a frame of the recording device. Thus, if the series of tracks with the suffix a are to be read in FIG. 2b, the stepper motor positions the lower read gaps of the head nominally between servo tracks X and Y. If the tracks having suffix b are to be read, the stepper motor moves the nominal position of the head between servo tracks Y and Z.

During recording or playback, the tape must also be "tracked" in order to maintain the gap on the head between servo tracks X and Y (or Y and Z) once initially positioned there. The tape guides or the tension in the tape only provides a coarse transverse constraint of the transverse movement of the tape. Also, a small air film may be present between the head and the tape. Thus, the tape is found to "wander" in the transverse direction as it passes over the head.

In one known way of tracking the tape, or for positioning the tape with respect to a particular servo track, the head is movable with respect to the tape. FIG. 3 represents the elements of a prior art method for tracking the tape. (In FIG. 3, the length of the tape runs in and out of the page; thus, FIG. 3 is a view along the direction of motion of the tape shown in FIGS. 2a and 2b, toward the head.)

The head 10 is supported by leaf springs 30a, 30b, which allow movement of the head in the transverse position. The ends of leaf springs 30a, 30b opposite the head 10 are attached to support 40. Support 40 is attached to frame 20 of the magnetic recording device via stepper motor 25. (In order to focus on the tracking elements interfacing with the head, the stepper motor has been reduced in representation in FIG. 3, but has been maintained in the figure to show spatial relationships.) Thus, after the stepper motor 25 positions the head 10 to read a particular series of tracks, as described above, the support 40 remains stationary with respect to the frame 20 of the magnetic recording device.

A magnet and coil device 50, analogous to a voice coil in a speaker, serves to move the head 10 transversely. The magnet portion 54 is rigidly attached to the head 10 and moves transversely with the head 10. The magnet portion 54 is surrounded by coil portion 52, which is attached via the support 40 to frame 20. The magnet and coil portions 52, 54 are positioned so that the magnet portion 52 can move in the transverse direction in response to a change in current in the coil 52.

The motion of the magnet portion 52 serves to also move the head 10 in the transverse direction. (The direction of motion in the transverse direction is determined by the direction of the current through the coil portion 52.)

The transverse wander of the tape described above is fairly continuous. The wander creates a change in the signals from the servo tracks that are read by the magnetic head. The processing of the change in the servo signal maintains an appropriate driving current at the coil so that the head moves transversely by a corresponding amount and thus "follows" the tape wander. In this manner of tracking, the head continues to follow the tape wander in a substantially continuous manner.

The change in current in the coil portion 52, which serves to move the head 10 transversely, is generated by electronic processing of the tracking signal received by reading the servo track, as shown for example in FIG. 2a or 2b. For example, if the read servo tracking signal indicates that the head has moved with respect to the tape transversely either up or down, the processing electronics will generate a change in current in the coil portion that moves the head 10 in the proper direction until the servo track is properly positioned over the gap.

Formats of tracking signals and the electronics used to read those signals and process an appropriate signal for the coil portion in order to adjust the transverse position of the head are well known in the art. Alternative tracking methods, such as optically detecting the edge of the tape, are also known.

The prior art practice of moving the head transversely with respect to the tape presents a number of difficulties. For example, although the head shown in FIG. 3 might be supported by movable leaf springs, the head also has relatively heavy electrical wires that extend to write and read amplifiers that are fixed to the frame. These wires interfere with the smooth movement and precise positioning of the head in the transverse direction by the voice coil 50 mechanism. Such imprecision is especially unsuited for future generations of tapes, which will have narrower tracks than ever before.

Also, the fixed tape guide and moving head is not well suited for the future generations of tapes. Future generations of tapes will not only be thinner and smoother, but will also have to run at higher speeds and demand improved wear characteristics (for example, an increase in the number of passes before the tape edge is degraded). Thinner tape requires lower tension in the tape drive. The lower tension, however, creates a haphazard packing of the tape on the reel.

That is, once the tape clears the guide (see FIG. 1) on the way to the reel, single winds of the tape on the reel are not well aligned, but become transversely shifted with respect to each other. (See FIG. 3a, a cross-section of a tape loosely wound onto a reel.) The transverse misalignment is the result of the reduced tape tension along with the air entrapped between the tape on the reel and the portion of tape being wound onto the reel.

Consequently, when the tape is wound off of the reel, the lateral force that may be imposed on the edges by the guides before passing over the head can be considerable. This can lead to rapid degradation of thin tapes.

An example of a prior art device in a manner similar to that described above with respect to FIGS. 1–3 is shown in U.S. Pat. No. 5,414,578. It is also known in the prior art to move the entire tape guide for tracking. The guide, however, is also relatively heavy. Thus, tracking the tape by moving the entire guide is not suited the precise tracking of thin, low tension tapes having a high density of tracks.

SUMMARY OF THE INVENTION

It is thus an objective of this invention to provide a magnetic tape drive that is capable of reading thin magnetic tapes having narrow tracks and high tape speeds. It is also an objective to provide such a magnetic tape drive that allows for a high number of passes of the tape—on the order of 100,000 to 1,000,000—before the tape edge starts degrading. It is also an objective to provide such a magnetic tape drive that provides a high pack quality of the tape on the reels.

In accordance with these objectives, the invention includes a magnetic tape drive comprising a magnetic head for reading and/or writing a magnetic tape passing thereover. The magnetic head is positioned for tracking a select track or series of tracks on the tape. The head is generally fixed to a frame or can be rendered stationary with respect to a frame. For example, a stepper motor may be interposed between the head and a frame of the magnetic tape drive and used for the initial positioning of the head with respect to the tape.

A source of magnetic tape, such as a reel, is positioned to a side of the magnetic head, while a collector of magnetic tape, such as a second reel, is also positioned to a side of the magnetic head. For tracking, at least one tape actuator is positioned between the magnetic head and either the source and collector. The tape actuator is comprised of a base with a surface portion defining a tape path over which the magnetic tape passes. In general, at least the base of the tape actuator is attached to the frame, or may be rendered stationary with respect to the frame. The tape actuator also includes at least one movable portion adjacent a first edge of the tape path and a corresponding counter-balancing portion adjacent the opposite (second) edge of the tape path. The movable portion is coupled to or interfaces with a drive for imparting movement to the movable portion in a direction transverse to the tape path. The movable portion has a hardened engagement portion for engaging the first edge of a tape in the tape path. The counter-balancing portion is resiliently movable in a direction transverse to the tape path and also has a hardened engagement portion for engaging the second edge of a tape in the tape path.

In a preferred embodiment, there are two tape actuators which move in unison. The first tape actuator is positioned between the source and the magnetic head, and the second tape actuator is positioned between the collector and the magnetic head. The two tape actuators "sandwich" the head: the source and first tape actuator are positioned to one side of the head while the collector and the second tape actuator are positioned to the opposite side of the head. When so positioned, the portion of the tape that is passing over the head is immediately moved in the transverse direction along with the movement of the uniform movement of the two actuators.

Also in preferred embodiment, the movable portion and the drive are comprised of a piezo-ceramic benders having one end that is stationary with respect to the base. The bender has a second unattached end adjacent the edge of the tape path. The piezo-ceramic bender bends in a direction transverse to the tape path when a voltage is applied to it. The drive includes electronics that outputs a voltage reflecting a tracking adjustment of a tape passing over the head, the voltage output being applied to the piezo-ceramic bender.

In a preferred embodiment, the hardened engagement portions of the movable and counter-balancing portions are ceramic. Also, the counter-balancing portion is a leaf spring having one end stationary with respect to the base and a second unattached end adjacent the edge of the tape path. The leaf spring is biased in a direction transverse to the tape path.

In an alternative preferred embodiment, the movable portion is a leaf spring having one end fixed with respect to the frame and a second unattached end adjacent the edge of the tape path. The leaf spring is biased in a direction transverse to the tape path. In this alternative embodiment, the drive is a voice coil comprised of a magnet portion and a coil portion. The coil portion of the voice coil is fixed with respect to the leaf spring and the magnet portion is fixed with respect to the frame. The drive also includes electronics that outputs a voltage reflecting a tracking adjustment of a tape passing over the head and this voltage output is applied to the coil portion of the voice coil.

DETAILED DESCRIPTION

Figure 4:
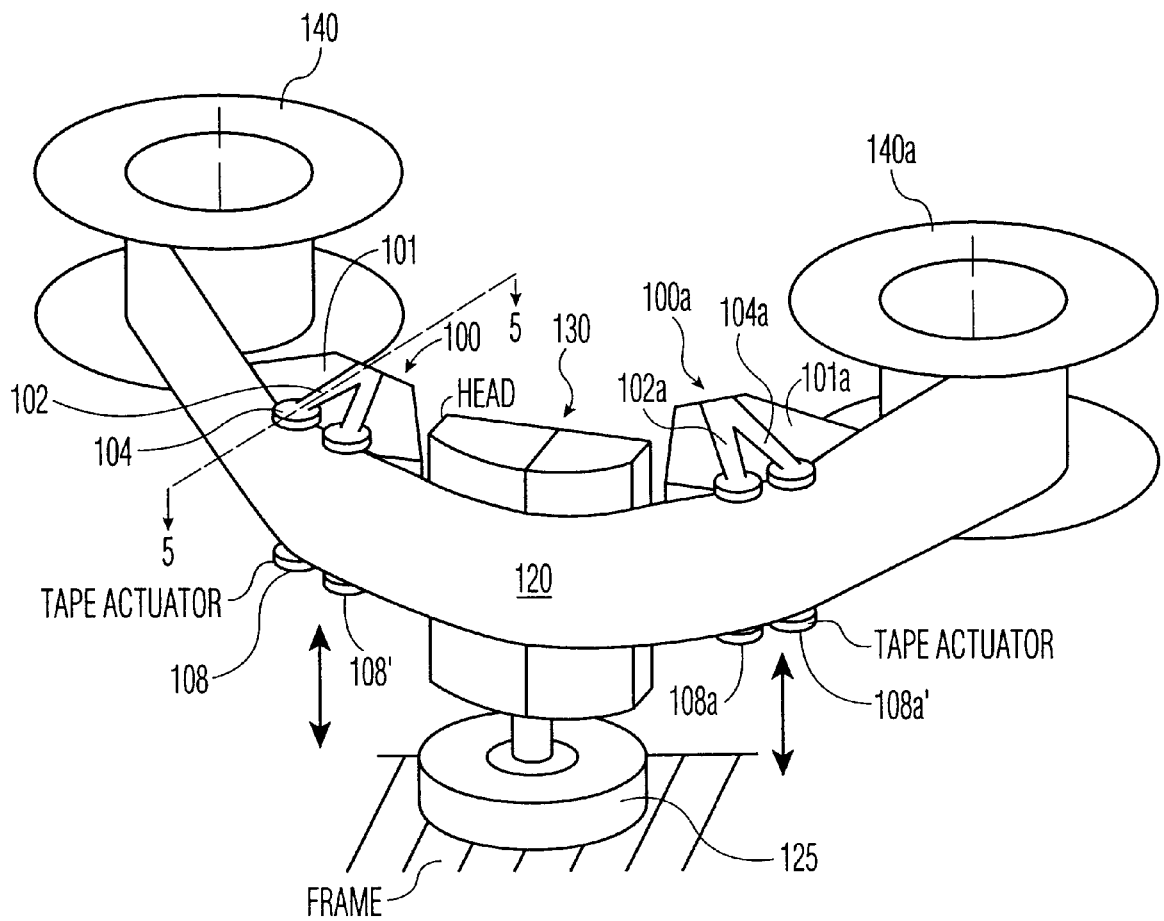
FIG. 4 is a representational perspective view of select components of an embodiment of a magnetic tape drive according to the present invention.
Figure 5:
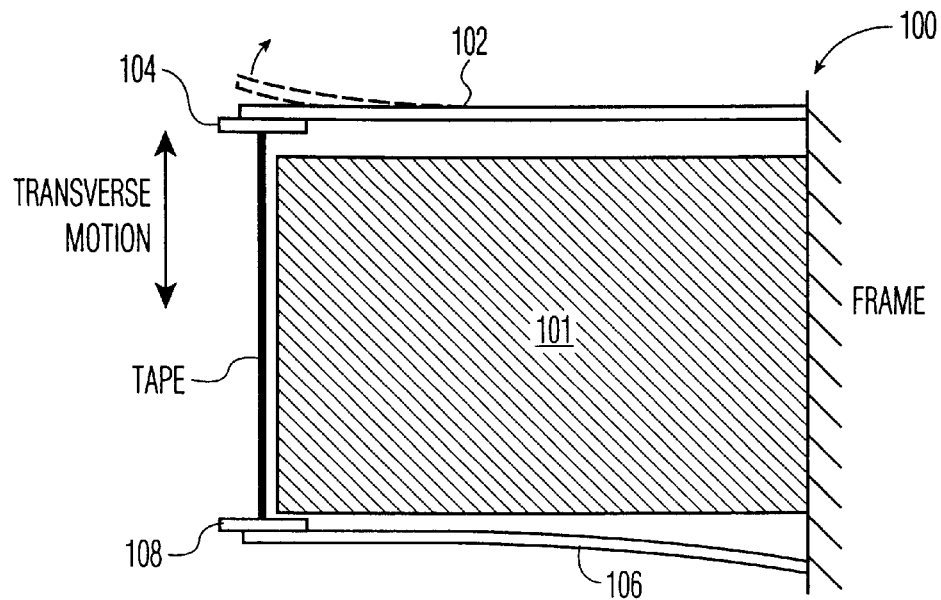
FIG. 5 is a representational cross-sectional view of one of the components shown in FIG. 4, taken across the line 5—5.

Referring to FIG. 4, a perspective view of an embodiment of the invention is shown. FIG. 5 is analogous to FIG. 1 in perspective, but, as described further below, portions of the tape actuators 100, 100*a* move transversely to provide the tracking. The head 130 is initially positioned with respect to the tape 120 via the stepper motor 125, thus selecting the series of tracks to be read.

Figure 1:
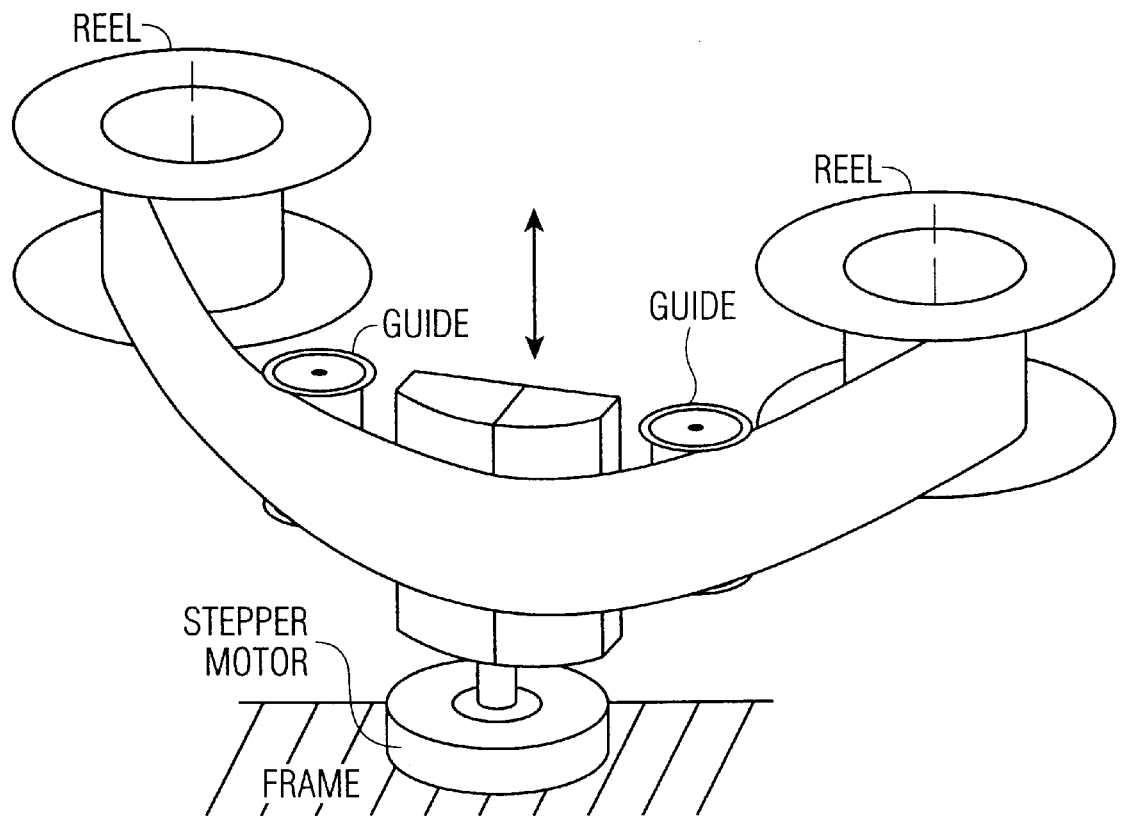
FIG. 1 is a representational perspective view of certain components of a known magnetic tape drive.

Like the position of the guides in FIG. 1, the tape actuators 100, 100*a* are interposed between the head 130 and the tape reels 140, 140*a*. The ensuing description will focusing on tape actuator 100, while recognizing that tape actuator 100*a* is identical.

Referring again to FIG. 4, it is seen that on one side of tape actuator 100 is a pair of piezo-ceramic benders 102, 102' each of which supports a ceramic button 104, 104'. A pair of leaf springs 106, 106' (extending in the same manner as the piezo-ceramic benders) on the opposite side of tape actuator 100 are obscured by the perspective view, but will be seen in more detail below in the description of FIG. 5. The ceramic buttons 108, 108' supported by leaf springs 108, 108' are partially visible in FIG. 4.

Figure 3:
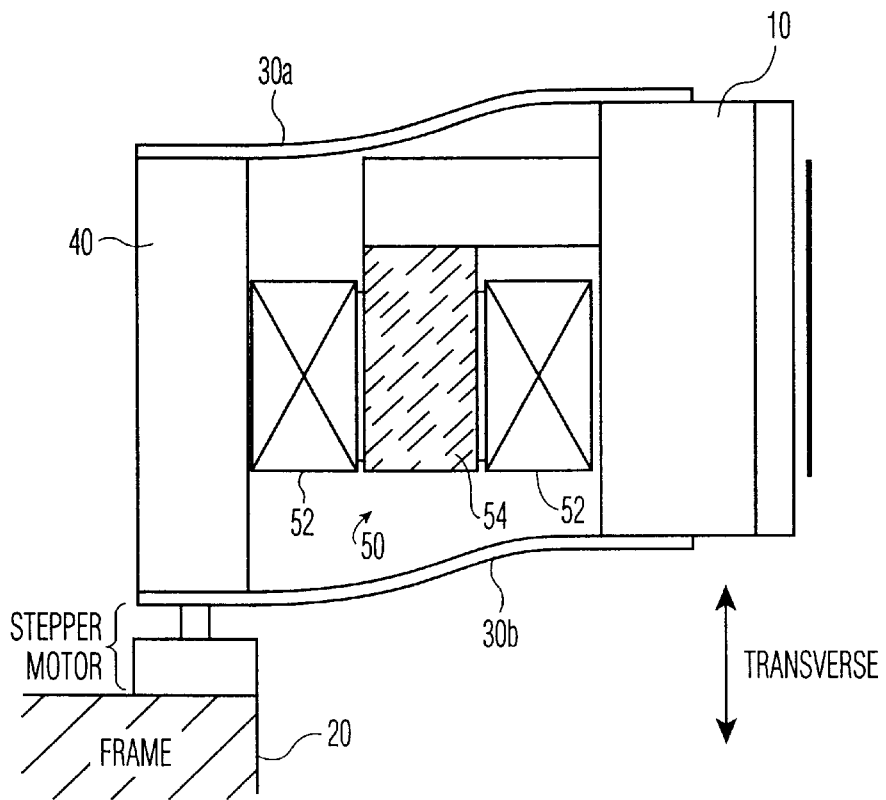
FIG. 3 is a representative cross section of the tracking mechanism of a prior art magnetic tape drive.
Figure 3A:
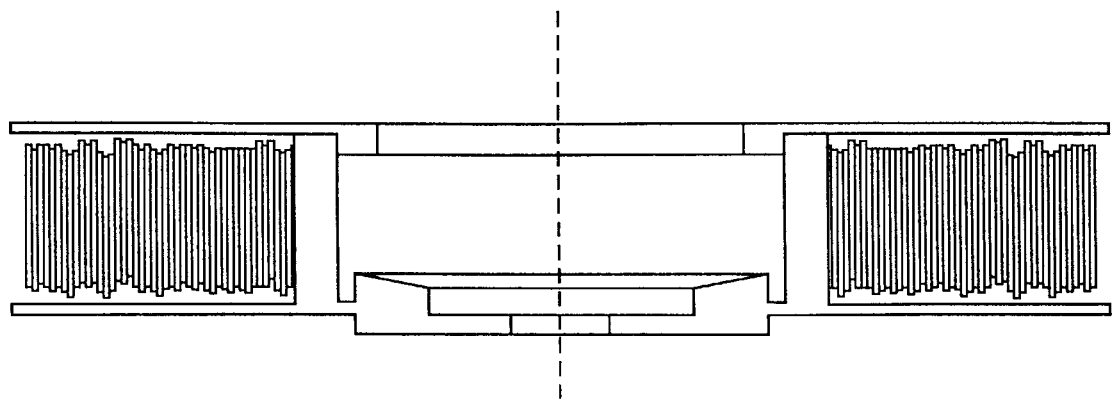
FIG. 3a is a cross-section of a tape reel having a magnetic tape wound thereon with a poor pack quality.

FIG. 5 is a representative drawing of a cross section of the tape actuator 100 taken at line 5—5 in FIG. 4. As seen, a fixed base 101 is attached to the frame of the magnetic recording device. Piezo-ceramic bender 102 and leaf spring 106 also extend from the frame and envelop base 101. (The piezo-ceramic bender 102 and leaf spring 106 could alternatively extend from the base 101 adjacent the frame, for example, if the base 101 had a flange portion adjacent the frame.) Attached to the end opposite the frame of each of the piezo-ceramic bender 102 and leaf spring 106 are ceramic buttons 104, 108, respectively. Extending between the ceramic buttons 104–108 is the magnetic tape, which from the perspective of FIG. 5 (like that of FIG. 3) moves in and out of the page.

The tape is shown as slightly separated from the underlying base in FIG. 4; this is again due to a small film of air that is trapped between the head and the surface due to the high speed of the tape. The magnetic tape is slightly wider than the supporting base 101, thus allowing the sides of the tape to engage the ceramic buttons 104, 108, as explained further below.

Referring back to FIG. 4, it is seen that the tape generally forms an arc as it passes over the tape actuator 100. This bend or arcing of the tape provides rigidity in the transverse direction at the point of engagement with the ceramic buttons 104, 108. In the plane shown in FIG. 5, ceramic button 104 exerts a downward transverse force on the tape via the rigidity of the piezo-ceramic bender 102. Similarly, ceramic button 108 exerts an upward transverse force on the tape via the bias of the leaf spring 106. When the forces are balanced, the tape is held in a stationary position in the transverse direction.

Piezo-ceramic bender 102 is of the two layer type that bends upward or downward (in the plane shown in FIG. 5) when a voltage is applied across it. An exemplary upward bend is shown in outline in FIG. 5; because one end is fixed at the base, the bending serves to translate the end having the ceramic button 104 in the direction of the arrow, or, equivalently, in the direction transverse to the tape. The amount of transverse motion of the ceramic button 104 is a function of the voltage applied to the piezo-ceramic bender 102.

Thus, when the piezo-ceramic bender 102 bends upward, as shown in FIG. 5, the bias of leaf spring 106 causes ceramic button 108 to push the tape upward until it is balanced by the force exerted by ceramic button 104 in its new position.

If the voltage is applied such that the piezo-ceramic bender 102 flexes downward (in the plane shown in FIG. 5), then ceramic button 104 will push the tape down against ceramic button 108. The leaf spring 106 will flex downward until the forces balance, thus providing a transverse movement of the tape in the opposite direction.

Referring back to FIG. 4, as noted above, second piezo-ceramic bender 102' on tape actuator 100 is identical to piezo-ceramic bender 102 described in FIG. 5. Similarly, the second leaf spring on the opposite side of tape actuator 100 that supports ceramic head 108' is substantially identical to leaf spring 106 described in FIG. 5. Additionally, tape actuator 100*a* has substantially identical features to that of tape actuator 100.

In a preferred embodiment, both pairs of piezo-ceramic benders 102, 104 and 102*a*, 104*a* on each respective head actuator 100, 100*a* are driven by the same signal and thus move in unison. Accordingly, each will act in unison in the manner described above with respect to FIG. 5, thus uniformly translating the tape by a certain amount in a transverse direction over the head, the amount (and direction) being a function of the voltage applied to the benders.

The unified movement of the two tape actuators shown in FIG. 4 on both sides of the head maintains the tape normal to the head. The force required to move the tape in a direction transverse to the head is relatively small and spread out along the tape at four ceramic buttons. The ceramic buttons, of course, also serve as tape guides. The hardened ceramic buttons serve as superior guides for high end data storage drives, which typically demand a lifetime in excess of 30,000 hours. For these drives, the tape is thin, hard and moves at a relatively high speed, and the hardened ceramic buttons of the present invention are more durable and provide a drive with a long lifetime.

Many common guide mechanisms of the prior art, such as rollers with rotating or stationary flanges that are typically made of steel or a nickel plated aluminum and magnesium composite, are insufficient for handling such a thin, hard, high speed tape. The tape quickly cuts and grooves the steel or nickel plating of such prior art guides, thus reducing the life of the drive. (It is noted, however, that some prior art guides using rollers had non-rotating flanges made of ceramic, thus providing added durability.)

Figure 2A:
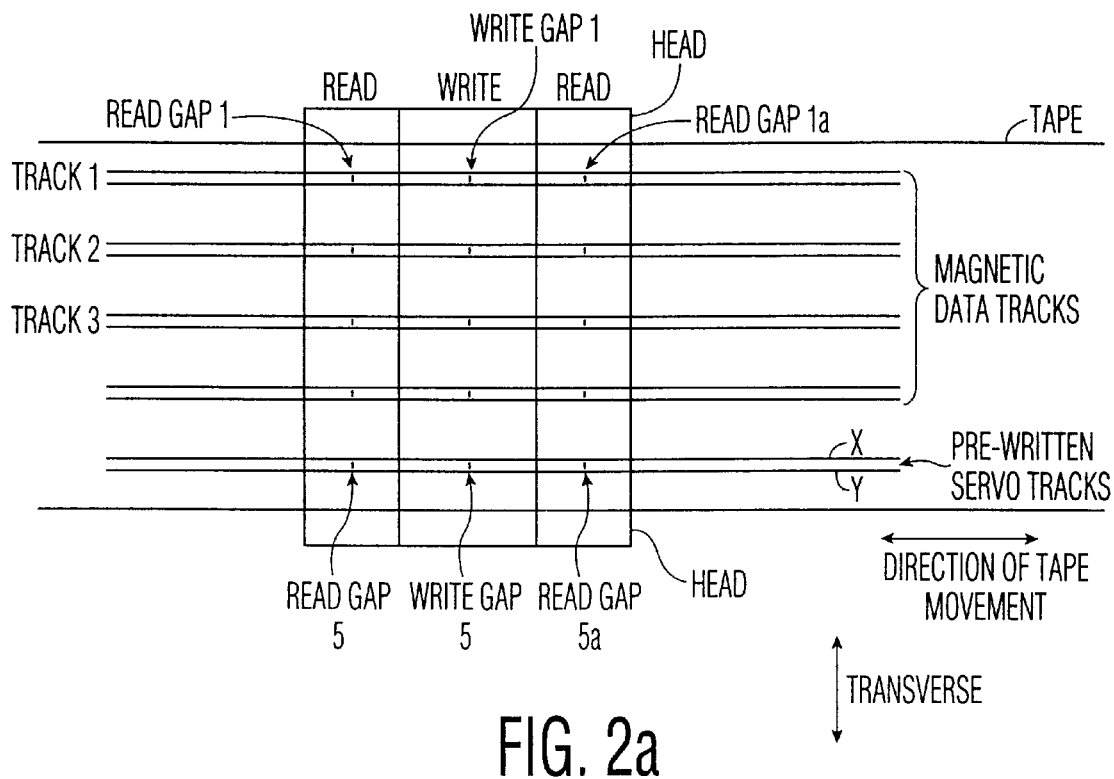
FIGS. 2a and 2b are representative views of a magnetic tape having multiple tracks passing over a magnetic head.
Figure 2B:
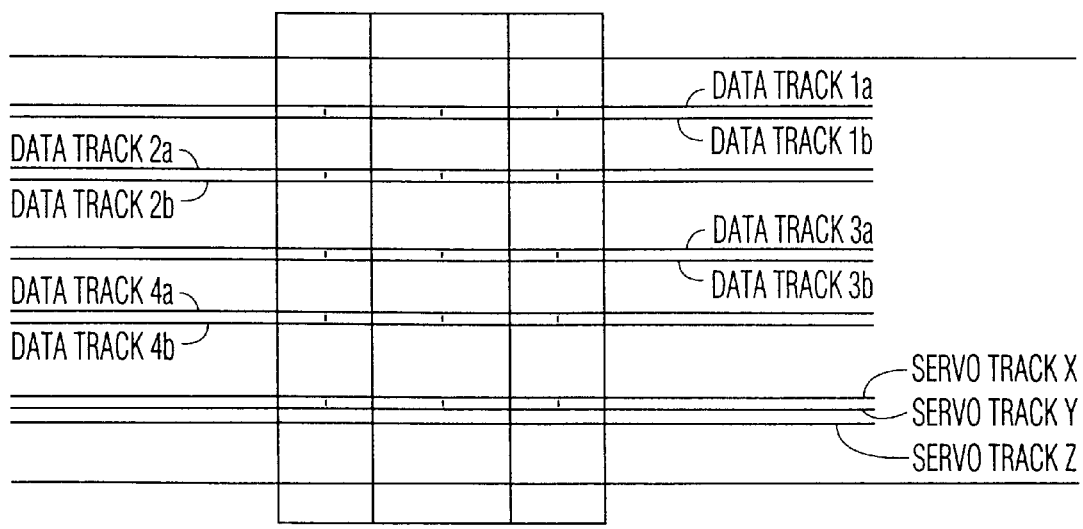

For tracking, the tracking signal is processed to provide the appropriate voltage at the piezo-ceramic benders. The signal may come, for example, from pre-written servo tracks such as those shown in FIGS. 2a and 2b. (Other tracking methods can be used to generate the signal.) After processing the servo signals, if a transverse adjustment of the tape is needed, the processing further determines the voltage signal needed to bend the piezo-ceramic benders by the needed amount. Thus, the tape is moved transversely as described above with respect to FIG. 4.

Tracking is improved over the prior art method of moving the head with respect to the tape. In the present invention, the head remains stationary during tracking while the transverse adjustment is made by the relatively light and unencumbered tape actuators. This configuration also improves the quality of the pack on the reel. In the prior art of adjusting the head to transverse movement of the servo track, the head effectively "chased" the tape in the transverse direction. Thus the tape was allowed to meander transversely, leading to poor pack quality on the reels.

In the present invention, it is the servo track of the tape that is adjusted to a transverse point (i.e., the tracking read gap) on a head. Thus, the servo track is maintained in a transverse straight line across one tape actuator, across the head and across the second tape actuator. This serves to align the tape transversely as it moves from the second tape actuator on to the reel. Thus, the pack is improved with each successive play of the tape.

Figure 6:
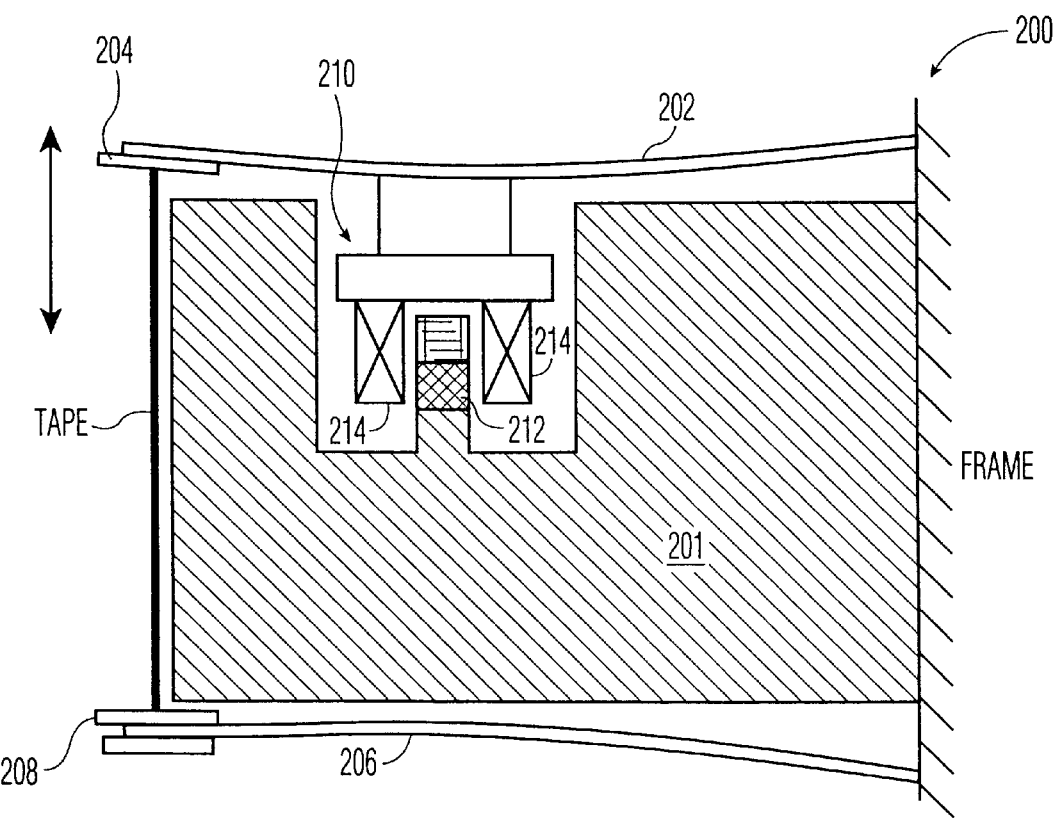
FIG. 6 is a representational cross-sectional view of a component of an alternative embodiment of a magnetic tape drive according to the present invention.

FIG. 6 shows an alternative to the embodiment shown in FIGS. 4 and 5. FIG. 6 is analogous to the view of FIG. 5, and analogous structure has been labeled with reference numerals in the 200 range. As seen in FIG. 6, the transverse motion is provided by the combination of a voice coil 210 and a second leaf spring 202 instead of a piezo-ceramic bender. The coil 214 of the voice coil is attached to leaf spring 202, while the magnet 212 is attached to the base 201. Thus, the tracking signal is processed to generate an appropriate current to move the coil 214 with respect to the magnet 212. The movement of the coil moves leaf spring 202 up or down (i.e., transverse to the tape) on a substantially continuous basis, thus providing for an up or down force on the tape via a ceramic button 204 or 208, similar to as described above with respect to FIG. 5.

It will be understood that various modifications can be made to the various embodiments of the present invention herein disclosed without departing from its spirit and scope. For example, various structures of the tape actuators and various actuators are contemplated. All such structures would fall within the scope of the present invention. Therefore the above description should not be construed as limiting the invention but merely as presenting preferred embodiments of the invention. Those skilled in the art will envision other modifications within the spirit and scope of the present invention as defined by the claims presented below.

What is claimed is:

1. A magnetic tape drive comprising:
    a) a magnetic head having at least one segment for reading a magnetic tape passing thereover;
    b) a source of magnetic tape positioned to a side of the magnetic head;
    c) a collector of magnetic tape positioned to a side of the magnetic head;
    d) at least one tape actuator positioned between the magnetic head and one of the source and collector, the tape actuator having a base with a surface portion defining a tape path over which the magnetic tape passes, the tape actuator further having at least one movable portion adjacent a first edge of the tape path and a corresponding counter-balancing portion adjacent the opposite second edge of the tape path, the movable portion coupled to a drive for imparting movement to the movable portion in a direction transverse to the tape path, the movable portion further having a hardened engagement portion for engaging the first edge of a tape in the tape path, the counter-balancing portion being resiliently movable in a direction transverse to the tape path, the counter-balancing portion further having a hardened engagement portion for engaging the second edge of a tape in the tape path.

2. A magnetic tape drive as in claim 1, wherein there are two tape actuators, the first tape actuator positioned between the source and the magnetic head, the second tape actuator positioned between the collector and the magnetic head.

3. A magnetic tape drive as in claim 1, wherein the at least one movable portion and the drive are comprised of a piezo-ceramic bender having one end stationary with respect to the base, the bender having a second unattached end adjacent the edge of the tape path, the piezo-ceramic bender bending in a direction transverse to the tape path when a voltage is applied thereto.

4. A magnetic tape drive as in claim 3, further comprising electronics that outputs a voltage that reflecting a tracking adjustment of a tape passing over the head, the voltage output being applied to the piezo-ceramic bender.

5. A magnetic tape drive as in claim 1, wherein the hardened engagement portions of the at least one movable and counter-balancing portions are ceramic.

6. A magnetic tape drive as in claim 1, wherein the counter-balancing portion is a leaf spring having one end stationary with respect to the base, the leaf spring having a second unattached end adjacent the edge of the tape path, the leaf spring biased in a direction transverse to the tape path.

7. A magnetic tape drive as in claim 1, wherein the movable portion is a leaf spring having one end stationary with respect to the base, the leaf spring having a second unattached end adjacent the edge of the tape path, the leaf spring biased in a direction transverse to the tape path.

8. A magnetic tape drive as in claim 7, wherein the drive is a voice coil comprised of a magnet portion and a coil portion.

9. A magnetic tape drive as in claim 8, wherein the coil portion is stationary with respect to the leaf spring and the magnet portion is stationary with respect to the base.

10. A magnetic tape drive as in claim 9, further comprising electronics that outputs a voltage that reflecting a tracking adjustment of a tape passing over the head, the voltage output being applied to the coil portion of the voice coil.

11. A magnetic tape drive as in claim 1, wherein the magnetic head is attached to a frame via a stepper motor interposed between the frame and the magnetic head, the stepper motor positioned to move the magnetic head in a direction transverse to magnetic tape passing thereover.

12. A magnetic tape drive as in claim 11, wherein the base of the at least one tape actuator is attached to the frame.

* * * * *